(12) United States Patent
Kreiner et al.

(10) Patent No.: US 8,037,247 B2
(45) Date of Patent: Oct. 11, 2011

(54) METHODS, COMPUTER PROGRAM PRODUCTS, AND SYSTEMS FOR PROVIDING AN UPGRADEABLE HARD DISK

(75) Inventors: Barrett Kreiner, Woodstock, GA (US); Jonathan L. Reeves, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 410 days.

(21) Appl. No.: 12/333,562

(22) Filed: Dec. 12, 2008

(65) Prior Publication Data
US 2010/0153621 A1    Jun. 17, 2010

(51) Int. Cl.
*G06F 12/00* (2006.01)
(52) U.S. Cl. ............ 711/114; 711/5; 711/115; 711/156; 711/170
(58) Field of Classification Search .................. None
See application file for complete search history.

(56) References Cited

U.S. PATENT DOCUMENTS

| | | |
|---|---|---|
| 2006/0036786 A1 | 2/2006 | Kreiner et al. |
| 2006/0080504 A1 | 4/2006 | Kreiner et al. |
| 2008/0005368 A1 | 1/2008 | Kreiner et al. |

*Primary Examiner* — Shawn X Gu
(74) *Attorney, Agent, or Firm* — Cantor Colburn LLP

(57) ABSTRACT

Methods, computer program products and systems for providing an upgradeable hard disk. The system includes a plurality of memory card slots and a controller. The controller includes a host interface in communication with a host computer, a memory card interface in communication with one or more memory cards located in one or more of the memory card slots, and a detection mechanism. The detection mechanism monitors the memory card slots for newly added memory cards; and in response to detecting a newly added memory card determines characteristics of the newly added memory card and updates the data placement strategy in response to the characteristics of the newly added memory card. The data placement strategy is utilized by the controller to determine write locations for write data received from the host computer via the host interface.

20 Claims, 3 Drawing Sheets

US 8,037,247 B2

METHODS, COMPUTER PROGRAM PRODUCTS, AND SYSTEMS FOR PROVIDING AN UPGRADEABLE HARD DISK

BACKGROUND

Exemplary embodiments relate generally to memory devices, and more particularly to providing an upgradeable hard disk (UHD).

Redundant Array of Independent Disks (RAID) is a technology that employs the simultaneous use of two or more hard disk drives to achieve greater levels of performance, reliability, and/or larger data volume sizes. RAID has become a term that is utilized to describe computer data storage schemes that can divide and replicate data among multiple hard disk drives. RAID's various designs all involve two key design goals: increased data reliability and increased input/output performance. When several physical disks are set up to use RAID technology, they are said to be in a RAID array. This array distributes data across several disks, but the array is seen by the computer user and operating system as one single disk. RAID can be set up to serve several different purposes. A RAID configuration affects reliability and performance in different ways. The problem with using more disks is that it is more likely that one will go wrong, but by using error checking the total system can be made more reliable by being able to survive and repair the failure. Basic mirroring can speed up reading data as a system can read different data from both the disks, but it may be slow for writing if the configuration requires that both disks must confirm that the data is correctly written. Striping is often used for performance, where it allows sequences of data to be read from multiple disks at the same time. Error checking typically will slow the system down as data needs to be read from several places and compared. The design of RAID systems is therefore a compromise and understanding the requirements of a system is important.

Secure digital (SD) cards are commodity storage products. They typically have relatively slow write and fast read capabilities and onboard circuitry that spreads the load evenly across all cells to prevent premature failure (e.g., logical to physical mapping). An SD card has a finite life span that can range from one hundred thousand to one million to ten million writes to a storage cell before failure. SD cards may be logically fragmented, but physically each cell has the same access time. Individual SD cards have individual performance characteristics with current speeds ranging up to about twenty-two megabytes per second (MB/S). Currently, there are two standards for SD cards, SD cards which may store from eight megabytes (MBs) to four gigabytes (GBs) per card, and SD high capacity (SDHC) which may store from four GBs to two terabytes (TBs) per card. Further, SD cards currently have three form factors: SD, mini SD, and micro SD, which are all electronically compatible with a passive adapter to make them interchangeable.

BRIEF SUMMARY

Exemplary embodiments include an upgradeable hard disk (UHD) system. The system includes a plurality of memory card slots and a controller. The controller includes a host interface in communication with a host computer, a memory card interface in communication with one or more memory cards located in one or more of the memory card slots, and a detection mechanism. The detection mechanism monitors the memory card slots for newly added memory cards, and in response to detecting a newly added memory card determines characteristics of the newly added memory card and updates the data placement strategy in response to the characteristics of the newly added memory card. The data placement strategy is utilized by the controller to determine write locations for write data received from the host computer via the host interface.

Additional exemplary embodiments include a method for providing a UHD. The method includes receiving write data from a host computer. The receiving is at a controller in a UHD that includes the controller and a plurality of memory card slots. The controller is in communication with one or more memory cards located in one or more of the memory card slots. A memory card in a memory card slot is selected as a target location for the write data, the selecting responsive to a data placement strategy and transparent to the host computer. The write data is transmitted to the selected memory card via the memory card interface. The memory card slots are monitored for newly added memory cards. In response to detecting a newly added memory card, characteristics of the newly added memory card are determined and the data placement strategy is updated based on the characteristics of the newly added memory card.

Further, exemplary embodiments include a computer program product, tangibly embodied on a computer readable medium, for providing an UHD. The computer program product has instructions for causing a computer to execute a method, which includes receiving write data from a host computer. The receiving is at a controller in a UHD that includes the controller and a plurality of memory card slots. The controller is in communication with one or more memory cards located in one or more of the memory card slots. A memory card in a memory card slot is selected as a target location for the write data, the selecting responsive to a data placement strategy and transparent to the host computer. The write data is transmitted to the selected memory card via the memory card interface. The memory card slots are monitored for newly added memory cards. In response to detecting a newly added memory card, characteristics of the newly added memory card are determined and the data placement strategy is updated based on the characteristics of the newly added memory card.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGs..

The detailed description explains the exemplary embodiments, together with advantages and features, by way of example with reference to the drawings.

DETAILED DESCRIPTION OF EXEMPLARY EMBODIMENTS

Exemplary embodiments provide the ability to aggregate multiple memory cards (e.g., SD cards) into a single hard disk. Memory cards in the hard disk can be added, removed and/or replaced, thereby providing a manner of fractionally upgrading the hard disk without having to replace the entire hard disk. Exemplary embodiments provide each memory slot with its own bus, which allows additional memory cards to be added to the hard disk without impacting performance. Exemplary embodiments implement a data placement strategy that determines which memory cards to utilize for particular write data. The data placement strategy can take into account things like the expected life for a particular memory card and/or a file type associated with the write data. The data placement strategy is updated when new memory cards are added to the hard disk. Exemplary embodiments provide an upgradeable hard disk (UHD) that may be implemented as a stand-alone unit or chained together with other UHDs to support larger volume of data (e.g., to support a datacenter).

Figure 1:
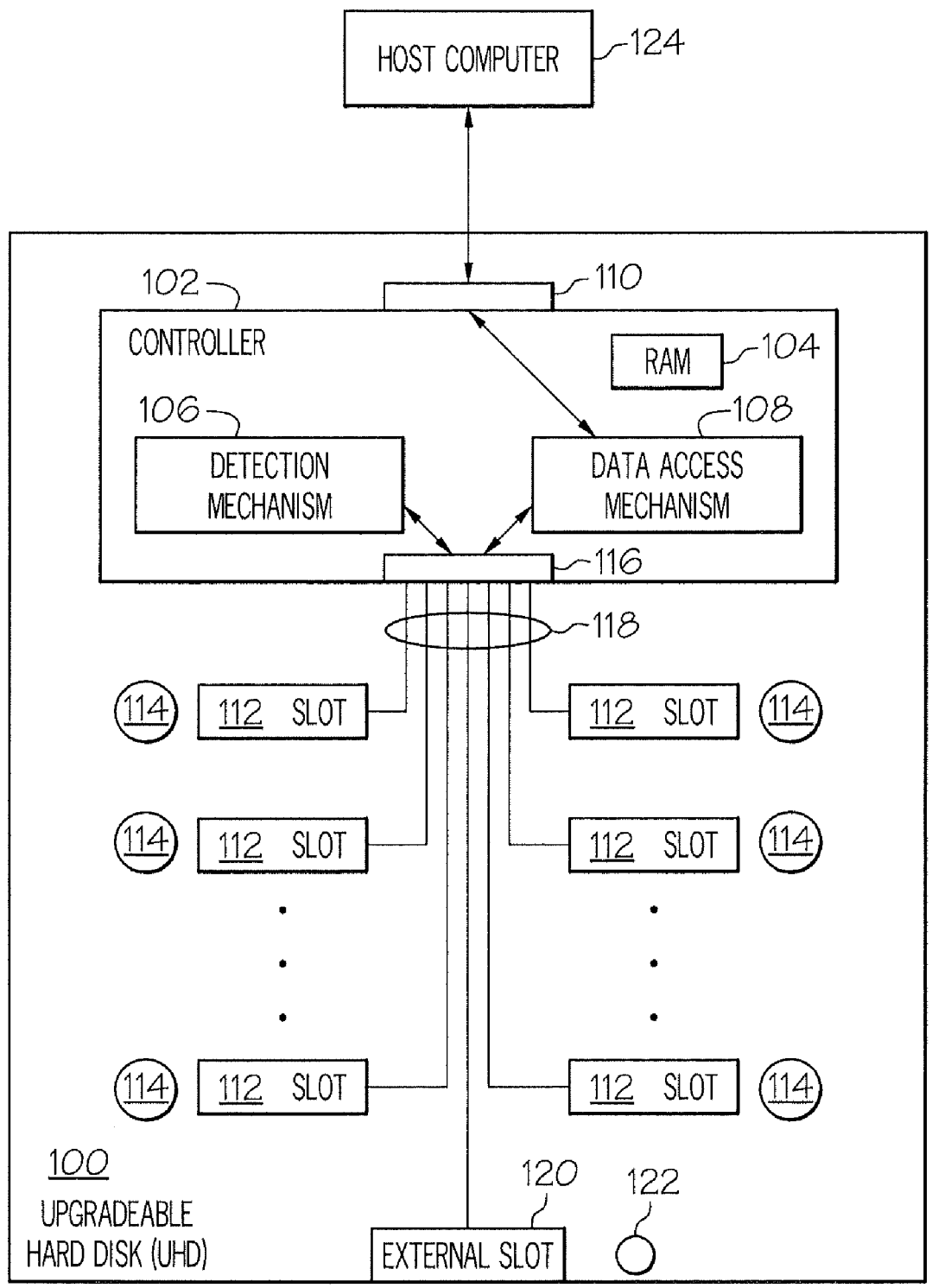
FIG. 1 illustrates a block diagram of an upgradeable hard disk (UHD) system that may be implemented by exemplary embodiments.

FIG. 1 illustrates a block diagram of a UHD system that may be implemented by exemplary embodiments. The exemplary UHD 100 depicted in FIG. 1 includes a plurality of memory card slots 112 and a controller 102. In exemplary embodiments, any number of memory card slots 112 (e.g., sixteen, thirty-two, etc.) may be include in the UHD 100 based on the physical size and capacity requirements of the UHD 100. In exemplary embodiments, the memory card slots 112 support SD memory cards, MiniSD memory cards, and MicroSD memory cards. In addition, the memory card slots 112 are connected to private busses 118 in order to maximize data access performance.

As depicted in FIG. 1, an exemplary controller 102 includes a detection mechanism 106 for detecting the presence of memory cards in the memory card slots 112, a data access mechanism 108 for performing data writes and reads in response to commands from the host computer 124, and random access memory (RAM) 104 for storing data utilized by the controller 102 (e.g., the data placement strategy, and the mapping between logical data addresses as understood by the host computer 124 and physical data addresses including memory card locations where the data is physically stored).

The controller 102 also includes a host interface 110 in communication with the host computer 124. In exemplary embodiments, the host interface 100 varies based on the application and may support interfaces such as, but not limited to: personal computer memory card international association (PCMCIA), CardBus, ExpressCard, integrated drive electronics (IDE) 44 (desktop)/40 (laptop), AT Attachment (ATA), Serial ATA (SATA), and universal serial bus (USB/firewall. In exemplary embodiments, the host interface 110 includes a snap on host interface that allows a UHD, such as UHD 100, to be reused with a different host interface.

The controller 102 depicted in FIG. 1 further includes a memory card interface 116 in communication with one or more memory cards located in one or more of the memory card slots 112. As depicted in the exemplary embodiment depicted in FIG. 1, the memory card interface 116 is connected to private busses 116 that are attached to the memory card slots 112. As depicted in FIG. 1, each memory card slot 112 is connected to its own bus 118 for communicating with the controller 102. This allows each memory card to be accessed independently of the other memory cards in the UHD 100 and provides performance improvements.

The exemplary controller 102 depicted in FIG. 1 also includes a data access mechanism 108. In addition, to performing other data access tasks, the data access mechanism 108 receives write data from the host computer 124 via the host interface 110. The data access mechanism 108 is implemented by hardware and/or software components. The controller 102 knows (i.e., from the detection mechanism 106) and keeps track of all memory cards in the UHD 100 that are currently available for write data. A memory card in one of the memory card slots 112 is selected by the memory controller 102 as a target location for the write data. The controller 102 selects a target memory card based on a data placement strategy stored at the controller 102 (e.g., in the RAM 104). The write data is transmitted to the selected memory card via the memory card interface 116 and is written to the selected memory card. In exemplary embodiments, two target or more memory cards are selected, based on the write data strategy.

In exemplary embodiments, the controller 102 decides how the write data will be stored across the available memory cards based on the data placement strategy. The controller 102 may decide to spread the load out evenly among all of the memory cards and/or it may place the write data based on file characteristics associated with the write data. For example, swap file write data may be placed to span all or most of the memory cards, seldom read file write data may reside on a single memory card, important files may be split among cards and/or mirrored, and important files may include checksums. In addition, the controller 102 may look at memory card characteristics such as usage to date/predicted end of life (e.g., can use older memory cards to emulate tape and/or can migrate data off of them), read/write speeds, and capacity to determine a memory card for the write data. Further, the controller 102 may avoid writing to memory cards that have had more than a threshold number of errors. The data placement strategy implemented by the controller 102 may include all of these data placement strategies, a subset of these data placement strategies, or additional data placement strategies.

As depicted in FIG. 1, exemplary controllers 102 also includes a detection mechanism 106 that monitors the memory card slots 112 for newly added memory cards. The detection mechanism 106 is implemented by hardware and/or software components. In exemplary embodiments, the monitoring is performed when the UHD 100 is powered on. In other exemplary embodiments, the monitoring is performed on a periodic basis while the UHD 100 is operating. If the detection mechanism 106 detects a newly added memory card, then it initializes the newly added memory card by reading the memory card characteristics (e.g., read/write speeds, capacity, manufacturer, date of manufacture, useful life/usage to date, etc.) A profile is then built so that the memory controller 102 can identify the memory card. The profile may include a unique serial number for the memory card and the usage to date. The profile is stored in one or both of the controller 102 and the memory card. The controller 102 then re-evaluates and updates the current data placement strategy based on characteristics associated with the newly added memory card as well as the other memory cards in the UHD 100. Depending on the updated data placement strategy, write data may be moved to the newly added memory card in an active or a lazy manner.

In exemplary embodiments, memory cards having different capacities are mixed on the same UHD 100. In other exemplary embodiments, memory cards having different data access speeds are mixed on the same UHD 100. By allowing a mixture of memory capacities and memory speeds, a fractional upgrade to higher capacity, faster memory cards may be implemented.

As depicted in FIG. 1, exemplary embodiments of the UHD 100 include visual indicator light emitting diodes (LEDs) 114 associated with each memory card slot 112. The LEDs 114 may be utilized to indicate a status of a card in the memory card slot 112. For example, blue may indicate that the memory card is online/active, green may indicate that the memory card is online/available, yellow may indicate that the memory card is online/degraded (physical or logical), red may indicate that the memory card is offline/failure, and orange may indicate that the memory card is offline and ready for removal. This is an example of one color scheme that may be implemented, other color schemes may also be implemented.

As depicted in FIG. 1, exemplary embodiments of the UHD 100 include an external memory card slot 120 along with an optional LED 122. The external memory card slot 120 may be utilized to provide a swap/copy/backup port for the UHD 100. In addition, the external memory card slot 120 may be utilized for migrating cards in and out of the UHD 100 when all of the memory card slots 112 are full.

In exemplary embodiments, the size of the UHD 100 (also referred to as the form factor) depends on where the UHD 100 will be utilized. The form factor may be a 1.8 inch hard disk drive (HDD) size, a 2.5 inch HDD size, a 3.5 inch HDD size, a 5.25 inch HDD size, a PCMCIA, an external for USB/firewall, or any other required size. In exemplary embodiments, to provide compatibility with existing hardware, the UHD 100 fits into an existing slot that holds a unified solid state hard disk.

The controller 120 also includes numerous other components not shown in order to simplify the figure. For example, the controller 120 may include an LED controller, working non-volatile RAM and/or a card history list to keep track of memory cards utilized on the UHD 100.

Figure 2:
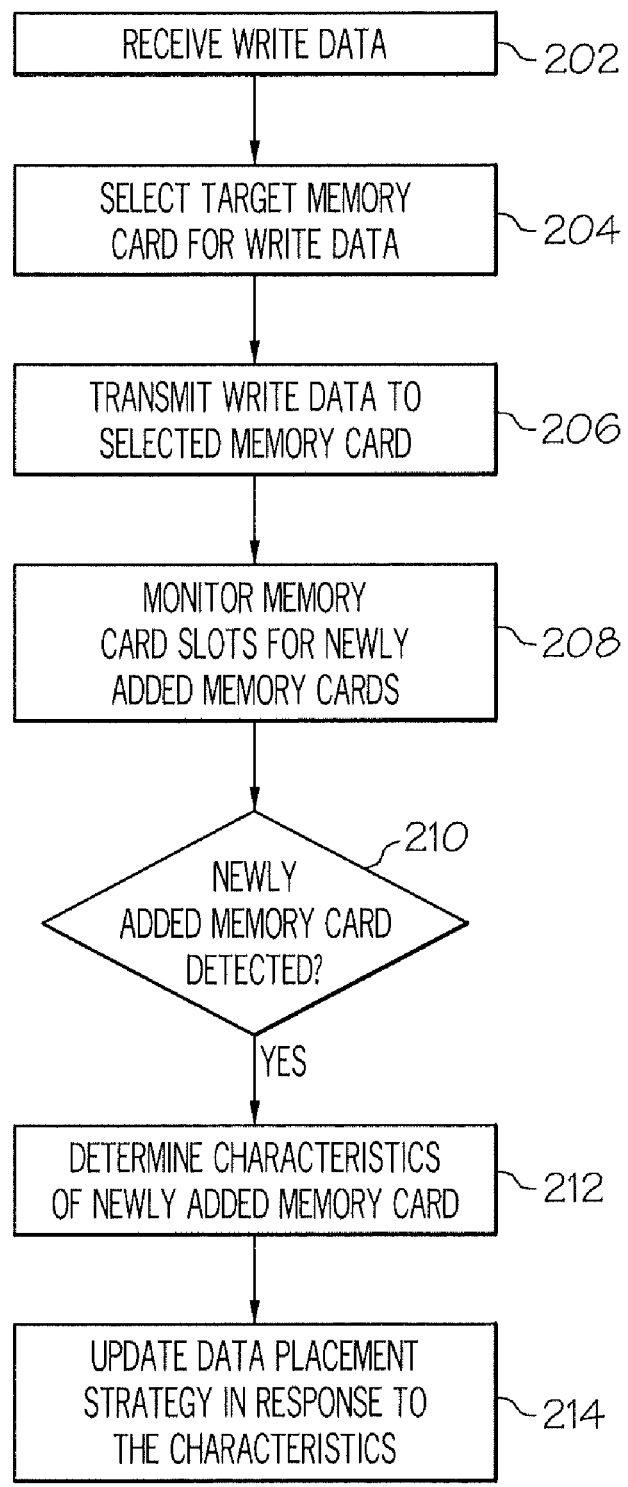
FIG. 2 illustrates a process flow for providing a UHD that may be implemented by exemplary embodiments.

FIG. 2 illustrates a process flow for providing a UHD that may be implemented by exemplary embodiments. At block 202, write data from the host computer 124 is received by the data access mechanism 108 in the controller 102. At block 204, a memory card is selected by the data access mechanism 108 as a target location for the write data. The target memory card is selected by the data access mechanism 108 based on the data placement strategy. At block 206, the data to be written (the write data) is transmitted by the data access mechanism 108 to the selected memory card via the memory card interface 116. At block 208, the detection mechanism 106 in the memory controller 102 monitors the memory card slots 112 for newly added memory cards. It is determined at block 210, if a newly added memory card has been detected. If a newly added memory card has been detected, then block 212 is performed and the detection mechanism 106 initializes the newly added memory card, including determining characteristics of the newly added memory card, and builds a profile. At block 214, the detection mechanism 106 updates the data placement strategy based on the characteristics of the newly added card as well as the existing cards in the UHD 100.

Figure 3:
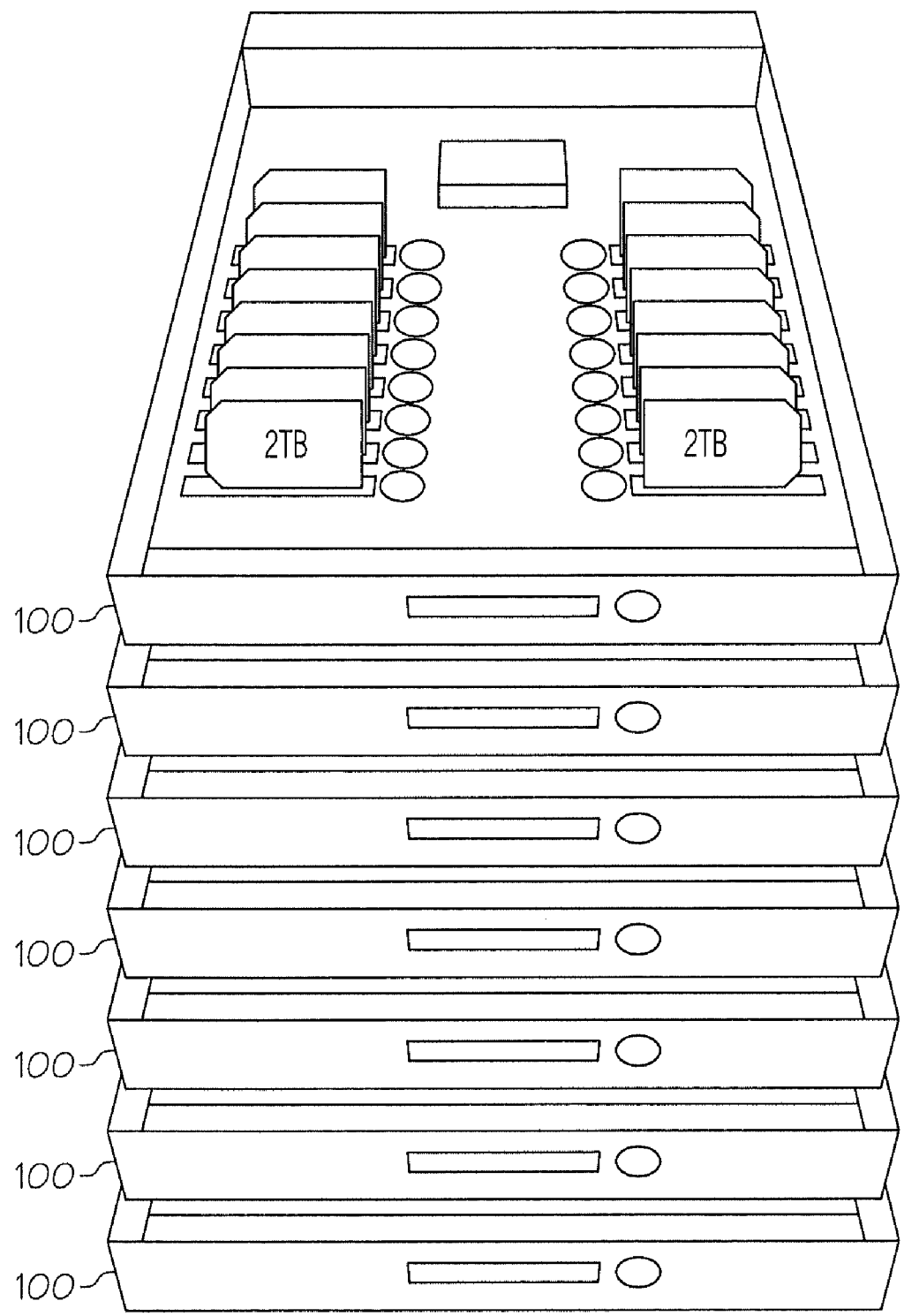
FIG. 3 illustrates a block diagram of a UHD system that may be implemented by exemplary embodiments.

FIG. 3 illustrates a block diagram of an upgradeable hard disk memory system that may be implemented by exemplary embodiments. As depicted in FIG. 3, two or more UHDs 100 are chained together. This configuration may be implemented, for example, in a data center setting. Exemplary embodiments of the UHD 100 described herein have characteristics that make them well suited to data center usage. For example, they have low power consumption, and memory cards can be selectively turned off as needed with no noticeable performance penalty (i.e., an instant massive array of inactive disks or "MAID"). In addition, from a thermal perspective, the memory cards have a wide operation temperature (generally listed as −25 degrees Fahrenheit to 185 degrees Fahrenheit) allowing them to be run with lower cooling or even just with outside airflow. Exemplary embodiments of the UHD 100 provide performance, combined with cost reductions realized through lower power and thermal requirements.

In exemplary embodiments, scaling may be done both horizontally (more memory card slots 112 per UHD 100) and vertically (multiple UHDs 100 chained together with existing high speed technologies like Ethernet, Fibre, Firewire, SCSI, etc.). For example, a UHD 100 in a standard three and a half inch form factor slot holds about two hundred and thirty microSD cards, for a single unit capacity of four hundred and sixty TBs. Horizontally, a single UHD 100 using a one hundred GB/s Ethernet interface may include five hundred memory card slots 112 and not exhaust capacity. Note that the UHDs 100 on peer-able networks (such as Firewire) may query each other and get information about memory cards that may be relocated within the UHD array. The capital investment of the UHD 100 but with upgrade features may lead to a longer usable life of the UHD 100 in the data center.

As the memory cards in the data center near the end of their usable life, the UHD 100 may be upgraded with newer memory cards, and /or older memory cards may be aggregated into specific UHDs 100, which are shifted from being an active memory card (e.g., utilized like a disk) to emulating a tape, enabling a solid state hierarchical file store model. Since writes are what shortens the life of an individual memory card, a tape model that limits write operations will increase the useful life of the memory card. The data placement strategy may also be altered based on the expected usable life of a given memory card in the UHD 100. The strategy change may lower the overall performance of a UHD 100 in tape mode, at the benefit of an extended useful life. This allows one media to behave as two different types, and the end consumer to realize the full use of the media until it eventually fails. A "sneakernet" approach may also be implemented, for example, when a memory card in an active UHD 100 is marked for relocation to a tape UHD 100, the active UHD 100 re-factors files into the moving memory card, thus causing much less data to be transported across the buses. In exemplary embodiments, a tape emulating UHD 100 is a specialty UHD 100 with several thousand memory card slots 112, since data access speed is not a limiting factor. In further exemplary embodiments, the replacement or swapping of the memory cards across UHDs 100 is automated.

An example configuration that may be implemented by exemplary embodiments includes a UHD 100 with a capacity of thirty-two TBs (e.g., sixteen two TB memory cards). Assuming that all memory cards have similar performance characteristics, the UHD 100 may implement a data placement strategy that spreads the load out across all of the cards evenly (similar to a RAID 0). In addition, the controller 102 may put some files on one, some, or all the memory cards based on characteristics of the file associated with the write data. A swap file, for example, would probably span all memory cards, where a seldom read (it at all) driver file may reside on a single memory card. The controller 102 may also make on the fly decisions, such as moving files around, how many and which memory cards to invoke for a given file, and extending if a file exceeds the targeted memory card capacity. Important files, as identified by the controller 102 or the host computer 124 could also be split and/or mirrored across cards (RAID 1, 1, 0+1), or, based on size and capacity, check summed (RAID 5), all on the UHD 100, without host computer 124 or user intervention.

In exemplary embodiments, when a memory card is added to the UHD 100, a master block data set name is written to the memory card so that is can potentially be identified by other UHDs. The master block data sent name may indicate the fact that the memory card was a member of a UHD 100 at one point, its usage to date, and that it was being used in disk or tape mode.

In exemplary embodiments, the UHD 100 (e.g., a sixteen GB UHD) is fractionally upgraded. A new sixteen GB memory card may be added to the UHD 100 (which memory card slot 112 does not matter as all are equal). The new memory card is initialized, its characteristics including, but not limited to: read/write speeds, capacity, manufacturer, and date of manufacture are read and a profile is built and stored in the controller 102. The controller 102 now re-evaluates the memory cards on the UHD 100 and may update the data placement strategy. Data moves to the memory card may be active (writes up front and may shorten lifespan) or lazy (as new parts of the file are written, only those written parts go onto the new memory card). If a data placement strategy is found to be incorrect for the new configuration, the UHD 100 may alter the strategy on the fly. If other memory cards support one million write operations and the new memory card supports ten million write operations, then the controller 102 may have a data placement strategy that includes migrating files to the new memory card.

If the example sixteen GB UHD 100 has a memory card nearing the end of its life, then the controller 102 may notify the user and start utilizing the memory card less, eventually migrating the data off of the memory card completely. Once migration has take place, the old memory card may be replaced, with a new sixteen GB SDHC (or another SD having a different capacity). Once inserted, the UHD 100 detects the capabilities of the memory card, and starts reevaluating the data placement strategy.

The example sixteen GB UHD 100 may have multiple memory cards nearing the end of their useful lives, and the controller 102 may not have enough resources to complete the migration, so it cannot migrate the data off of the memory cards. In this case, the user may add a new sixteen GB memory card to the UHD 100. The controller 102 then immediately transfers data from the end of life memory cards to the new memory card, regardless of the current data placement strategy, to make sure that the data is preserved. In this example, the UHD 100 may continue to advertise its capacity to the host computer 124 as twenty-six GB, and the user does not remove the end of life memory cards. The older memory cards can then be used for write one read many (WORM) storage for the remainder of their life. When errors are detected or the WORM is used up, the controller 102 will indicate to the user that the card should be removed by, for example, changing the LED 114 to red. Note, that the user cannot "fool" the controller 102 by taking a marked memory card and putting it back in another memory card slot 112 because the profile in the controller 102 will remember the memory card and prevent its capacity from being utilized.

As described previously, an exemplary UHD 100 is equipped with a bonus slot, or external memory card slot 120. This external memory card slot 120 may be utilized to copy files in and out of the UHD 100, to provide a migration slot for a fully loaded UHD 100 that needs a memory card replacement, or as an additional slot in an overloaded UHD 100. Once the data is migrated, the user can swap the memory card from the external memory card slot 120 to an identified memory card slot 112 (note that this would be an offline operation as data would be temporarily unavailable). The SD standard also supports the SDIO on the same slot, so the external memory device slot 120 may have an I/O device either chaining to other UHDs or automating a backup to near line/offline storage. The external memory device slot 120 may also allow a drive-based hierarchical file store and/or automated backup to a memory card or another UHD 100. This provides push button online disk migration without intervention by the host computer 124. Since the SDIO feature is available on each memory card slot 112, there is also the potential to use the old "tree" technology and extend the storage capacity of each memory card slot 112 with multiplexed storage. Again, the capacity increase is taken at a performance hit. The trees would essentially be a miniature UHD 100 themselves.

As described above, exemplary embodiments can be in the form of computer-implemented processes and apparatuses for practicing those processes. Exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. Exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the present disclosure has been described with reference to exemplary embodiments, it will be understood by those skilled in the art that various changes may be made and equivalents may be substituted for elements thereof without departing from the scope. In addition, many modifications may be made to adapt a particular situation or material to the teachings of the present disclosure without departing from the essential scope thereof Therefore, it is intended that the present disclosure not be limited to the particular exemplary embodiments disclosed for carrying out this invention, but that the present disclosure will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An upgradeable hard disk system comprising:
 a plurality of memory card slots; and
 a controller including:
  a host interface in communication with a host computer;
  a memory card interface in communication with a memory card located in one of the memory card slots; and
  a detection mechanism:
   monitoring the memory card slots for newly added memory cards, the monitoring via the memory card interface; and
   in response to detecting a newly added memory card:
    determining characteristics of the newly added memory card; and
    updating a data placement strategy in response to the characteristics of the newly added memory card, wherein the data placement strategy is utilized by the controller to determine write locations for write data received from the host computer via the host interface.

2. The system of claim 1, wherein the controller further comprises a data access mechanism:
- receiving the write data from the host computer via the host interface;
- selecting a memory card in a memory card slot as a target location for the write data to define a selected memory card, the selecting responsive to the data placement strategy, the selected memory card transparent to the host computer; and
- transmitting the write data to the selected memory card via the memory card interface.

3. The system of claim 1 wherein the memory card interface includes a separate bus from the controller to each of the memory card slots.

4. The system of claim 1 wherein the memory card is a secure digital (SD) card.

5. The system of claim 1 wherein there are two memory cards having different capacities and different data access speeds located in two of the memory card slots.

6. The system of claim 1 further comprising an indicator light associated with a memory card to indicate a status of the memory card associated with the indicator light.

7. The system of claim 1 further comprising an external memory card slot.

8. The system of claim 1 wherein the upgradable hard disk system is chained to another upgradeable hard disk system.

9. The system of claim 1 wherein the data placement strategy is responsive to a file type associated with the write data.

10. The system of claim 1 wherein the data placement strategy is responsive to a request to migrate data off of a memory card.

11. The system of claim 1 wherein the data placement strategy is responsive to a predicted useful life of the memory card.

12. The system of claim 1 wherein the data placement strategy is responsive to errors detected in the memory card.

13. A method for providing upgradeable storage, the method comprising:
- receiving write data from a host computer, the receiving at a controller in an upgradeable hard disk that includes the controller and a plurality of memory card slots, wherein the controller is in communication with a memory card located in one of the memory card slots;
- selecting the memory card in a memory card slot as a target location for the write data to define a selected memory card, the selecting responsive to a data placement strategy and transparent to the host computer;
- transmitting the write data to the selected memory card via a memory card interface;
- monitoring the memory card slots for newly added memory cards; and
- in response to detecting a newly added memory card:
  - determining characteristics of the newly added memory card; and
  - updating the data placement strategy in response to the characteristics of the newly added memory card.

14. The method of claim 13 wherein the memory card is a secure digital (SD) card.

15. The method of claim 13 wherein there are two memory cards having different capacities and different data access speeds located in two of the memory card slots.

16. The method of claim 13 wherein the data placement strategy is responsive to a file type associated with the write data.

17. The method of claim 13 wherein the data placement strategy is responsive to a request to migrate data off of the memory card.

18. The method of claim 13 wherein the data placement strategy is responsive to a predicted useful life of the memory card.

19. The method of claim 13 wherein the data placement strategy is responsive to errors detected in the memory card.

20. A computer program product, tangibly embodied on a computer readable medium, for providing upgradeable storage, the computer program product including instructions for causing a computer to execute a method, comprising:
- receiving write data from a host computer, the receiving at a controller in an upgradeable hard disk that includes the controller and a plurality of memory card slots, wherein the controller is in communication with a memory card located in one of the memory card slots;
- selecting a memory card in a memory card slot as a target location for the write data to define a selected memory card, the selecting responsive to a data placement strategy and transparent to the host computer;
- transmitting the write data to the selected memory card via a memory card interface;
- monitoring the memory card slots for newly added memory cards; and
- in response to detecting a newly added memory card:
  - determining characteristics of the newly added memory card; and
  - updating the data placement strategy in response to the characteristics of the newly added memory card.

* * * * *